US008458144B2

(12) United States Patent
Maydew et al.

(10) Patent No.: US 8,458,144 B2
(45) Date of Patent: Jun. 4, 2013

(54) DATA DEDUPLICATION METHOD USING FILE SYSTEM CONSTRUCTS

(75) Inventors: Stacy Lee Maydew, Frederick, CO (US); Scott Cary Hammett, Golden, CO (US); Howard Leslie Freeman, Arvada, CO (US)

(73) Assignee: Oracle America, Inc., Redwood City, CA (US)

( * ) Notice: Subject to any disclaimer, the term of this patent is extended or adjusted under 35 U.S.C. 154(b) by 364 days.

(21) Appl. No.: 12/603,751

(22) Filed: Oct. 22, 2009

(65) Prior Publication Data

US 2011/0099154 A1  Apr. 28, 2011

(51) Int. Cl.
*G06F 12/00* (2006.01)

(52) U.S. Cl.
USPC ......................................... 707/692

(58) Field of Classification Search
USPC .................................. 707/692, 697
See application file for complete search history.

(56) References Cited

U.S. PATENT DOCUMENTS

| | | | | |
|---|---|---|---|---|
| 5,978,791 A * | 11/1999 | Farber et al. | | 707/640 |
| 7,143,251 B1 * | 11/2006 | Patterson | | 711/162 |
| 7,412,462 B2 * | 8/2008 | Margolus et al. | | 1/1 |
| 7,685,459 B1 * | 3/2010 | De Spiegeleer et al. | | 714/6.12 |
| 7,747,584 B1 * | 6/2010 | Jernigan, IV | | 707/692 |
| 8,041,907 B1 * | 10/2011 | Wu et al. | | 711/161 |
| 8,121,993 B2 * | 2/2012 | Blount et al. | | 707/698 |
| 8,171,004 B1 * | 5/2012 | Kaminski, Jr. | | 707/698 |
| 2002/0049760 A1 * | 4/2002 | Scott et al. | | 707/10 |
| 2004/0143713 A1 * | 7/2004 | Niles et al. | | 711/162 |
| 2008/0235163 A1 * | 9/2008 | Balasubramanian et al. | | 706/12 |
| 2008/0294696 A1 * | 11/2008 | Frandzel | | 707/200 |
| 2009/0192978 A1 * | 7/2009 | Hewett et al. | | 707/1 |
| 2009/0234892 A1 * | 9/2009 | Anglin et al. | | 707/201 |
| 2010/0042790 A1 * | 2/2010 | Mondal et al. | | 711/161 |
| 2010/0094817 A1 * | 4/2010 | Ben-Shaul et al. | | 707/697 |
| 2010/0106691 A1 * | 4/2010 | Preslan et al. | | 707/674 |
| 2010/0169287 A1 * | 7/2010 | Klose | | 707/692 |
| 2011/0016095 A1 * | 1/2011 | Anglin et al. | | 707/692 |
| 2011/0016152 A1 * | 1/2011 | Popovski et al. | | 707/797 |
| 2011/0040728 A1 * | 2/2011 | Akirav et al. | | 707/634 |

* cited by examiner

*Primary Examiner* — Fred I Ehichioya
*Assistant Examiner* — Richard Bowen
(74) *Attorney, Agent, or Firm* — Marsh Fischmann & Breyfogle, LLP; Kent A. Lembke

(57) ABSTRACT

A data deduplication method providing direct look up and storage in an instance repository (IR). The method includes receiving a data object and processing the data object to generate a fingerprint that includes a location component, which defines a file location within the IR such as by first using a hash function to create a hash for the data object and parsing the hash value into sub-strings defining sub-directories of the IR. The method includes determining whether the data object is a duplicate by verifying the presence of a file in the IR at the file location. Determining if the data is unique involves performing a system call on the IR providing the location component as the file path. The method includes, when a file is not in the IR, updating the IR to store the data object as a file at the file location defined by the location component.

13 Claims, 5 Drawing Sheets

DATA DEDUPLICATION METHOD USING FILE SYSTEM CONSTRUCTS

BACKGROUND OF THE INVENTION

1. Field of the Invention

The present invention relates, in general, to data storage and reduction or control of redundant data, and, more particularly, to a method of performing data deduplication that includes storing deduplicated instance information within, or in a manner similar to that used for, a standard file system. For example, the data deduplication method may include building an instance repository provided with disk storage that is configured with a conventional file system arrangement to store instances as files located using file system conventions rather than using existing techniques of storing instance access information in a database, in-memory index, or other indirect access storage that requires a two step process (e.g., instance look up in a first device/memory structure and then retrieval based on obtained location/pointer information to instance data).

2. Relevant Background

The amount and type of data storage is rapidly expanding, and data management is rapidly becoming a significant cost for many businesses or enterprises. Particularly, enterprise data is growing exponentially and today's businesses need a way to dramatically reduce costs associated with data storage and management. Enterprises also have to provide proper data back up to meet their needs such as servicing clients and complying, with regulations and laws regarding maintaining data for relatively long periods of time. A complication for most businesses is the enterprise data may be highly dispersed over many machines, data storage centers, and interconnected networks/systems.

Data deduplication may be used to lower overall costs of physical data storage by storing only a single instance of unique data (e.g., only one copy of particular data such as a file or data object is stored) for an enterprise or group sharing access to data. Deduplication is fast becoming a standard feature in many data storage systems, but existing data deduplication techniques have a number of limitations including the use of database, in-memory index, or similar mechanism to store the information that is needed to retrieve a specific instance of unique data.

Data deduplication generally is used to refer to the elimination of redundant data. In the deduplication process, duplicate data is deleted to leave only one copy or instance of the data to be stored. For example, a single copy of a document, an image, an e-mail, a spreadsheet, and other data objects for which there may have been numerous copies on a system may be stored in one or more data stores/data storage devices accessible by workers or operators in an enterprise such as a typical business or the like. Indexing of all the data or copies of the data is still retained during deduplication so that the data may be later retrieved with the index providing a unique name and location for the data object. In many deduplication processes, a database of the indexed data is provided that includes key-value pairs providing a key for identifying the data and a value that provides a location of the data (or a pointer/reference to the remote data location). The key or unique identifier for a data object (e.g., a file for a file system) is often generated by creating a hash of the object. Then, deduplication may involve comparing a hash of a new or ingested file with hashes of existing files in data storage. When files/objects with identical hashes are identified, the copy is removed and a new file (or reduced data file) is stored that points to the old or single stored instance.

Deduplication is useful as it is able to reduce the required storage capacity as only unique data is stored. In an e-mail example for an enterprise, a typical e-mail system may contain one thousand instances of the same one megabyte file attachment. If the e-mail system is backed up or archived, all data is stored with all one thousand instances, of the attachment being saved in data storage, which requires one thousand megabytes. However, with data deduplication, only one instance of the attachment is actually stored in an instance repository, and each subsequent instance identified during the data ingestion step of deduplication is simply reference to the one saved copy, e.g., with a key-value pair in an index file of a database or with information of an in-memory index. In this example, data deduplication reduces storage requirements from one thousand megabytes to about one megabyte.

SUMMARY OF THE INVENTION

Briefly, a new method of performing data deduplication is provided that removes the need for a separate database or index to determine whether an ingested data object is a duplicate. The method generally uses a fingerprint generation software application to create fingerprints for each received data object, and these fingerprints include a location portion and a name portion. The location portion may be generated by use of a strong hash function (e.g., SHA-512 or the like) to create a hash of the data object, and then this hash value may be segmented into an equally sized segments or sub-strings. Each of these sub-strings may then be used to define a sub-directory of a conventional file system directory structure, which is used in an instance repository (IR). In this manner, a determination of whether a received data object is a duplicate includes determining a fingerprint of the object and then using a system call (such as stat( ) or the like) on the IR using the location component as the file path for an instance of the data object in the IR. The name portion of the fingerprint may be generated using a function that processes the data object to produce a unique identifier such as a non-secure hash function, e.g., a standard cyclic redundancy check that provides a CRC for the data object.

More particularly, a data deduplication method is provided that includes providing a data duplication service on a computer system and the service May include a fingerprint generating module that is executed or run by one or more microprocessors. The method includes receiving a data object such as file or block of data at the service from system data storage/memory. The method also includes processing the data object with the fingerprint generation module to generate a fingerprint for the data object. The fingerprint may include a location component that defines a file location within an instance repository (ER). The service may also act to determine whether the data object is a duplicate by verifying the presence of a file in the IR at the file location defined by the location component of the fingerprint.

In some cases, the location component of the fingerprint has a value equal to the output of a hashing algorithm applied to or run on the data object (such as strong hash function such as a SHA-512 hash or the like), and the fingerprint generation module may also parse the hash output to divide it into a number of segments or sub-strings (e.g., 16 chunks that are each 32 bits in size when the hash value is a 512-bit binary string).

The IR may be configured as a conventional file system with a standard directory structure, and in such cases, each of these sub-strings of the location component may be associated with or define a sub-directory of the IR directory structure. Determining whether the object file is a duplicate then may involve performing a system call on the IR providing the location component as the file path argument. The method may also include, when a file is present at the location (i.e., the data object is a duplicate of a stored instance of the IR), removing the data object from system data storage and writing an entry in a reduced-data store that includes the location component (e.g., the hash value that points to the IR file). The method may further include, when a file is not present at the location (i.e., the data object is unique), updating the IR to store the data object as a file at the file location defined by the location component (e.g., using the file path provided by the segmented hash value from the data object's fingerprint).

DETAILED DESCRIPTION OF THE PREFERRED EMBODIMENTS

Figure 1:
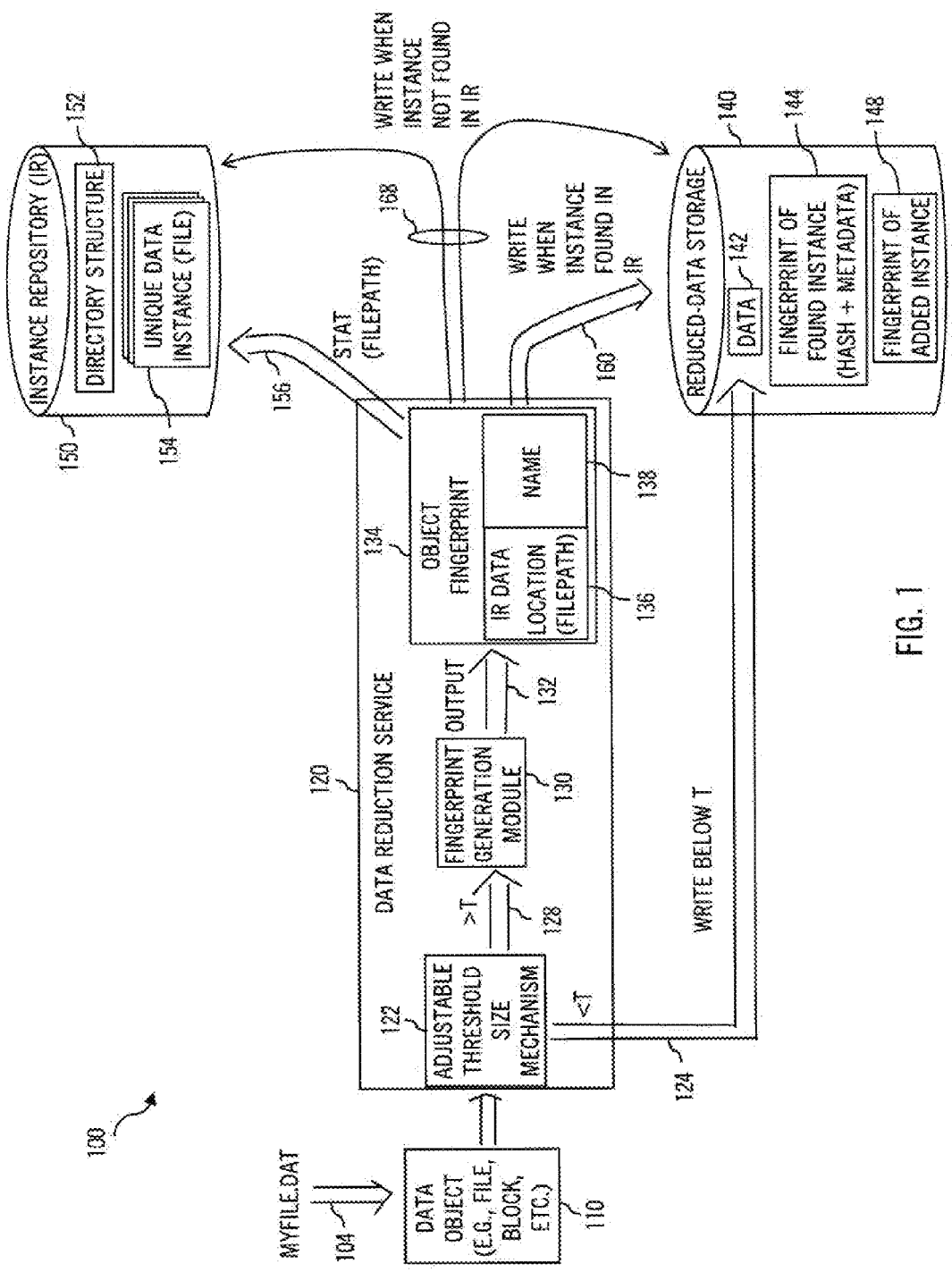
FIG. 1 illustrates process flow during data deduplication processes performed using a data object fingerprinting technique described herein to allow instances of unique data to be stored in a file system (e.g., via directory structure formed based upon a parsing of a hash value-based data object identifier or fingerprint to define nodes of a directory)

Briefly, the following description is directed to methods of providing more efficient data reduction including providing data deduplication using a unique fingerprinting technique that is combined with an enhanced data storage technique based on this fingerprinting. Briefly, prior data deduplication typically involved using a hashing algorithm or function to create a hash value for a data object (such as a data file). The hash value is used to index the data such as part of an in-memory index or as part of a database file that, provided an index, or key (e.g., the hash value) and a location value or reference that points to the remote location of the data. In other words, these are indirect methods in which an index is stored in one storage location and the instance of the unique data is stored in another storage location, which may be a separate device, a separate system/network, or the like. Additionally, these are two step techniques to access data as a look up is performed first followed by accessing of the data, and present a number of limitations including often being relatively slow and being limited in size (e.g., by use of a database file for key-value pairs).

In contrast, the data reduction techniques described below may include a method of storing instances of unique data in a conventional-type file system using a directory structure that is built from each data object's fingerprint. Briefly, a fingerprint generation module may be provided as a software application called or provided as part of a file manager (e.g., a module within a data reduction service or data deduplication module). The fingerprint generation module in turn may have a first portion that is used to generate a location segment or component of the fingerprint and a second portion that is used to generate a name segment or component, and these two components are combined to provide a file name for the data object. The location segment is used to provide a directory path for the named file (instance) with the directory structure taking the form of a conventional file system with a root directory having a plurality of subdirectories/nodes branching down to a consistent depth where the file providing the instance of the unique data.

In one embodiment, the first portion of the fingerprint generating module for creating the location component for the instance file includes a hashing function or algorithm (e.g., a strong hashing algorithm to limit collisions) that creates a hash value from a data object. To form the location component, the hash value is divided (typically equally) into a predefined number of sequential segments that are used to define subdirectories/nodes of a directory structure that is used to define a location (e.g., define a directory path (or file path) in the instance repository or the like) for the unique data file or the instance. The name component may be created in a number of ways with one exemplary embodiment providing a second portion of the fingerprint generating module that operates to determine a cyclic redundancy check (CRC) code or CRC for the data object (same object for which the hash value was generated), and the name component of the file name may be set to the CRC (or "CRC.instance" in some cases). Using these fingerprints for the data objects of an enterprise system or other computing system/network, an instance repository (IR) can be provided in which unique data or instances may be stored as conventional files with associated hash values defining the location of the file in the file system (or on the disk by defining which subdirectory will contain the file) and with a CRC providing a relatively unique name for the data.

To explain these concepts further, it may be useful to describe data flow during a data reduction process. For example, a data reduction process 100 is shown in FIG. 1 that may be used to provide data deduplication, and the process 100 may be carried out or implemented using one or more computer devices (e.g., a computer such as a server using a processor(s) to execute code to provide the data reduction service 120) that are communicatively linked (wired or wireless linking via one or more network devices, for example, for digital data communications) with data storage (e.g., the repositories/storage 140, 150 may be conventional disk storage or other data storage devices). The process 100 is discussed below while files are being ingested by the data reduction service 120 to build an instance repository (IR) 150 and provide reduced-data storage 140 storing references to the single stored copy or instance 154 of unique data (which is stored in IR) without requiring a separate index file to allow later access of the data (e.g., to later retrieve data).

As shown, the ingest process of data reduction 100 may start with a data object 110 being received or accessed by a data reduction service 120. The data object 110 may take nearly any form to practice the invention such as unstructured data in the form of files or blocks of data (e.g., e-mails, images, documents, and the like) and/or such as structured data in the form of files or blocks of data (e.g., block level data such as mainframe data or the like). The data object 110 may be fed into the service 120 from a data source (e.g., as an object Myfile.dat file or the like), with the data source being nearly any computing or data storage device provided on a network or computer system. For example, the process 100 may be performed on an enterprise to reduce data (e.g., perform data deduplication) on desktops/workstations/other computers, servers, data storage, and so on (e.g., data reduction may be performed to reduce duplicate data in an e-mail server system or the like and each machine storing such data may provide at 104 input in the form of data objects 110 such as e-mails with attachments).

The data reduction service 120 may include a threshold size filter or mechanism 122 that acts to determine whether the size of the data object is greater than some threshold size value, T (e.g., 16 k-128 k). This may be useful because efficiencies associated with creating single instances 154 that are stored in an IR 150 and referenced by fingerprints/references 144 may not be achieved, in some cases, when the files/objects 110 are relatively small. To this end, the threshold mechanism 122 may compare the size of the data object 110 with the threshold value, T, which may be adjusted by a system administrator or a service 120 user, and when the threshold is exceeded (or at least met) the object may be passes as shown at 128 to a fingerprint generation module 130. If the threshold, T, is not exceeded, the data reduction service 120 may act to store or write as shown at 124 the data 142 in reduced-data storage 140. A client application or device may then retrieve the data 142 (e.g., with a call referring to Myfile.dat or the like) directly from the reduced-data storage 140.

The fingerprint generation module 130 processes the entire file or other data object 110 and generates an object fingerprint 134. The fingerprint 134 includes an IR data location component or value 136 (e.g., a file path to a file in the repository 150) and also a name field or component 138, and these two combine to provide a file name for instances stored as files 154 in the IR 150. As is explained below in detail, the location 136 is used to define where a file system provided by or defined by the directory structure 152 an instance of the data object 110 should be found (if a copy is already stored at 154 in IR repository) or where it should be stored (if not yet present in the IR 150). The location 136 generally defines a file path in the directory structure 152 for the data object 110 while the name value 138 provides a unique (or relatively unique) identifier for the data object 110. In some embodiments, the location is a parsed or segmented version of a hash built for the data object 110 by the generation module 130 while the name 138 is the data object's CRC generated by the module 130.

In the data reduction, the data reduction service 120 acts at 156 to determine, based on the fingerprint 134, whether one of the unique data instances/files 154 matches the data object 110. As discussed above, the directory structure 152 of the IR 150 may be a conventional directory with a root directory/node and a plurality of subdirectories or nodes branching to a consistent depth (with the depth of the structure 152 depending upon the number of segments or partitions that the fingerprint generation module 130 divides the hash value, for example, to create the location value 136). In such an IR 150, the instances are stored as files 154 at locations defined by the location 136 for the corresponding data object. Hence, a POSIX stat(filepath) or similar file status/query command issued to the IR 150 will determine whether a file 154 is present at a location in the directory structure 152 corresponding to or matching the location value 136 of the object fingerprint 134.

When such a file 154 is present, the process 100 at 160 includes writing the fingerprint 134 of the object 110 in the reduced-data storage 140 as shown at 144. Further, as shown, the information stored may also include metadata useful in building or providing the file 154 to a requesting application/client. As discussed in more detail below, the fingerprint 144 with its location component (e.g., a hash value for the data object 110 that has been segmented to define subdirectories in the IR 150) provides a reference or pointer to the location of the instance or file 154 corresponding to the fingerprint/metadata entry 144 in the reduced-data storage 140. When the status or file lookup at 156 does not find a matching file or instance 154, the data reduction service 120 functions at 168 to update the IR 150 and its directory structure 152 to include the data object as an instance or file with the name 138 at the location 136 defined by the fingerprint 134. Also, the service may store a fingerprint/metadata entry 148 for the added instance in the reduced-data storage 140 to provide a reference to this instance 154.

Figure 2A:
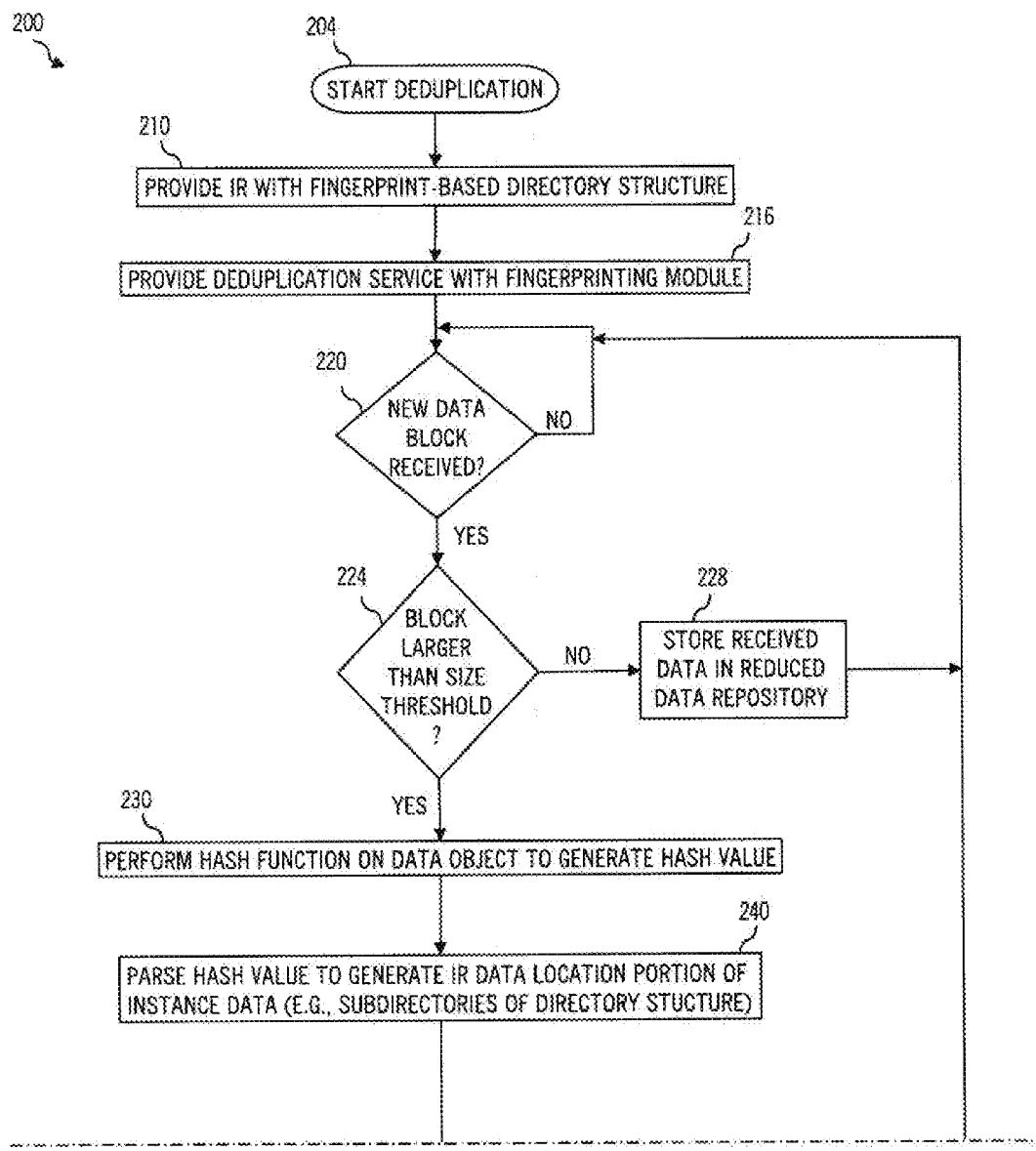
FIG. 2 is a flow diagram of a data reduction process according to an embodiment that includes fingerprinting and instance storage methods described herein as may be carried out by a data storage system including microprocessors executing code including code defining a data deduplication service with a fingerprint generating module.
Figure 2B:
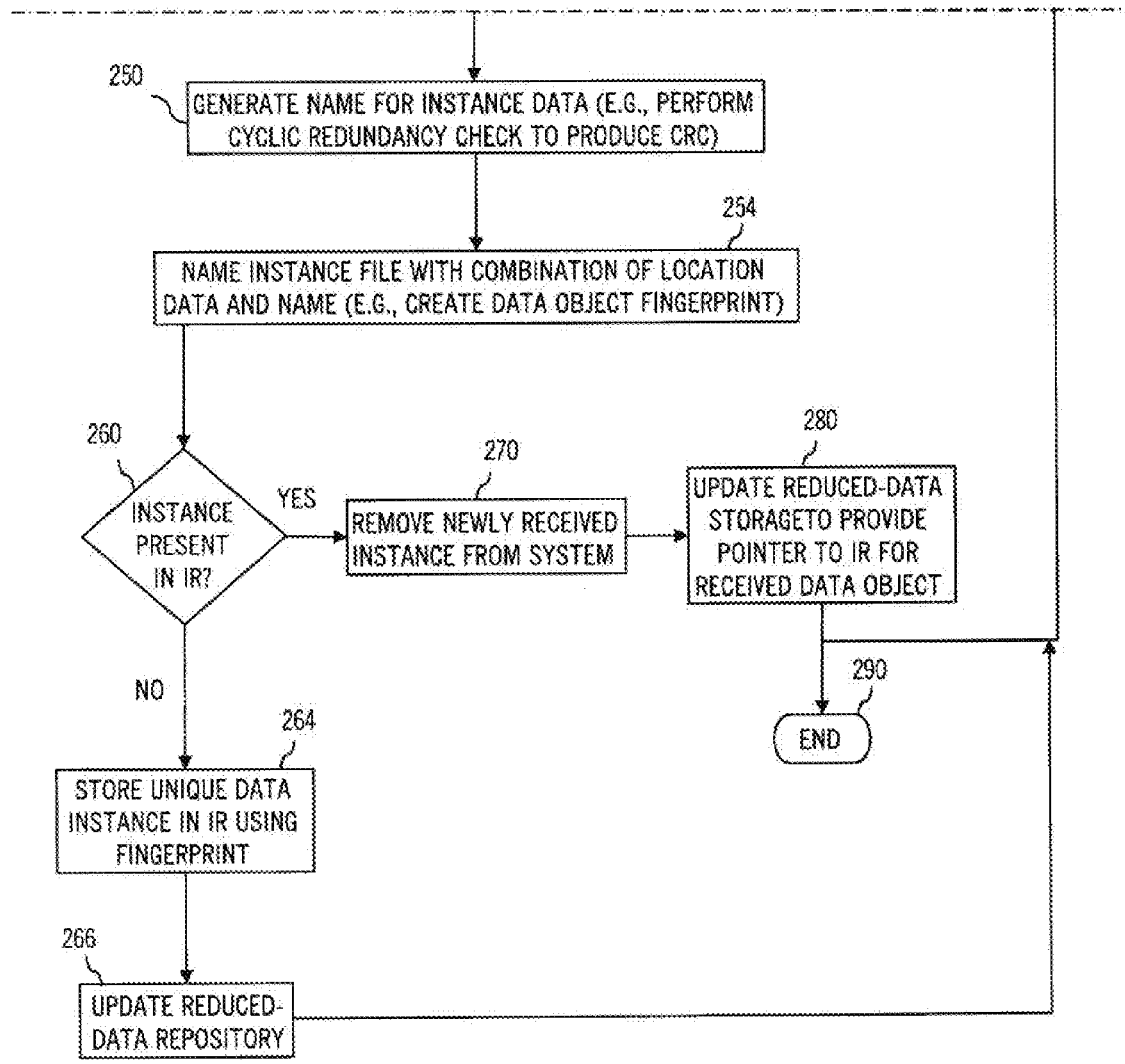

FIG. 2 illustrates a data deduplication method 200 that may be adapted to use standard file system constructs for storing instances and for quick verification of the existence of copies of ingested data objects. The method 200 starts at 204 such as with a selection of a technique for defining a location for a file storing a copy of an instance or a set of unique data. Step 204 may also include choosing technique for providing a name component of each instance file. For example, 204 may include defining which hashing algorithm or function will be utilized in a fingerprint generation module and how output hashes for ingested data object will be segmented/parsed to define subdirectories of the data structure in an instance repository (IR). Step 204 may also include selecting a naming component such as a CRC module that generates a CRC or CRC code for the ingested objects to define the name component/value (with some modification such as "CRC.instance" or the like) that can be combined with the segmented/partitioned hash to provide a file name that defines a file path for a particular file for each ingested instance. A CRC module may include a non-secure hash function to provide the CRC code (or just CRC) for a data object such as a standardized cyclic redundancy check function (e.g., CRC-16, CRC-32, CRC-64-ISO, or the like).

Figure 4:
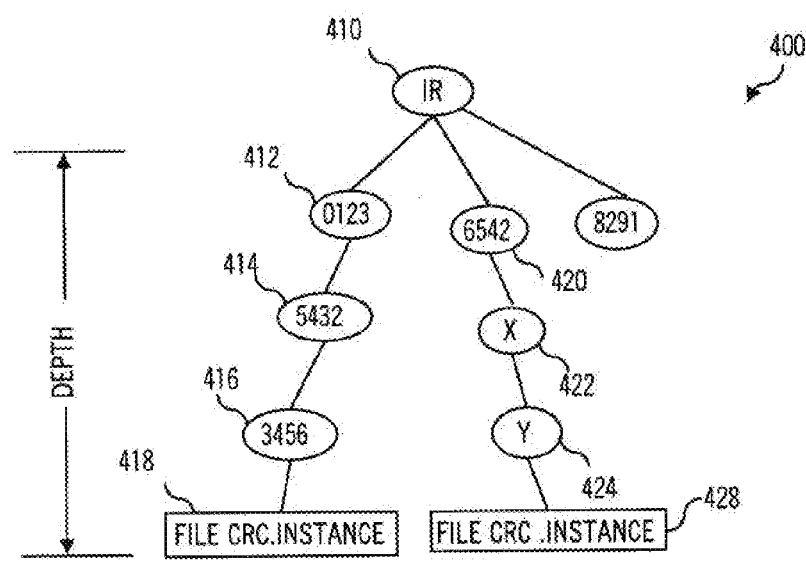
FIG. 4 illustrates a simplified example of an instance repository data structure that may be produced and stored in an instance repository (which may be provided on one machine such as a disk storage device or over two or more data storage devices, in one or more file systems, on one or more networked devices, or the like) during data reduction or deduplication methods described herein.

The method 200 may continue at 210 with providing an IR with a fingerprint-based directory structure in one or more data storage devices (that may be on one or more machines and one or more systems/networks). Typically, the IR directory structure takes the form of a conventional file system with a root directory and subdirectories/nodes, and the instances/files may be provided at the lowest layer or same depth of this directory structure (e.g., due to using a single hashing function and a like number of subdirectory segmentations/divisions of the hash, the depth of the structure is consistent for each file). An exemplary structure that may be built or provided in method 200 is shown in FIG. 4. The IR will be provided in the computer system or network upon which the method 200 is performed such that it is accessible by the data reduction service/deduplication module for checking for unique data files/instances and also for adding received data objects at locations defined by the fingerprinting process when such data objects are not yet present in the IR.

At step 216, a deduplication service is loaded or otherwise provided upon a computer system such, as a server as a software application/suite, and the service includes a fingerprinting module (or can call such a standalone module providing this functionality). As discussed above with reference to step 204, the fingerprinting module typically will include a hashing portion that is adapted for applying a hashing algorithm on a data object (e.g., an ingested file or block of data) to provide a hash value, that may be parsed or divided into a set of segments that include values that are used to define unique subdirectories in the IR directory structure. Also, the fingerprinting module includes code executable to define a CRC for the data object for use in naming the file for the data object. Further, the data deduplication service may include a comparison mechanism that is useful for accessing the IR to determine whether a file already is present in the IR that matches the received instance (e.g., with a single look up rather than a two-part or two step process as was more typical of prior deduplication services).

At 220, the method 200 continues (such as part of an overall data reduction process in a computer system, for example) with waiting for a new data object to be received during the ingest process. When a data object is received, the method 200 continues at 224 with a determination of whether the size of the data object exceeds a threshold minimum size (e.g., a size of a data object for which fingerprinting and storage of a single, referenced instance is more efficient use of data storage than keeping separate copies of the data such as in a reduced-data storage). When the received data object is smaller than (or does not exceed) the threshold size, step 228 may be performed to store the received data object in a reduced-data store (or taking no further step such as by retaining a file at the source device/machine).

When the threshold is exceeded at 224, the method 200 may continues at 230 with performing a hashing function of the fingerprint generation module on the data object (e.g., hashing an entire file or block of data) to produce a hash value. At 240, the hash value is parsed to generate an IR data location portion of the instance data (sometimes called file name herein). In some cases, a strong hashing algorithm is applied (such as one of the Secure Hash Algorithms designed by the National Security Agency such one from the SHA-0, SHA-1, or SHA-2 families, e.g., SHA-256, SHA-512, or the like) to provide a string (e.g., an American Standard Code for Information Interchange (ASCII) string of a particular size depending upon the hashing algorithm) that is then parsed or divided into a predefined or selected number of segments/portions, with each segment of the hash defining a subdirectory or node of a data structure tree in the IR. For example, step 240 may call for the hash value or string to be divided into 3, 4, or more segments to define a like number of subdirectories, which define a file path in the IR where the file/instance is stored (or where a copy of the data has already been stored).

At 250, the method 200 includes generating a name for the received data object, and this may include determining a CRC for the data object. Then, the instance data may include a name including the CRC (e.g., "CRC.instance" or the like). At 254, the instance or data object file is named or labeled with a combination of the location data (e.g., segmented/parsed hash value) and name (e.g., CRC code for the data object for which hashing was performed). Steps 230-254 provide a fingerprint for the data object.

The method 200 may continue at 260 with accessing the IR with the fingerprint to determine whether a file matching the received and fingerprinted data object is already stored or present in the IR. This may be completed in some cases with a standard file system status check (e.g., a stat(filepath) command or the like with "filepath" defined by the segmented hash value that is used to define the location of each data object in method 200). If the data is not unique (i.e., a file is located in the IR at a location defined by the fingerprint), the method 200 continues at 270 with removing the newly received instance from the system/device(s) undergoing data reduction (e.g., from a client machine or an e-mail server or the like). At 280, the reduced-data storage is updated such as to provide a pointer to the file in the IR that is associated with the data object received at 220 by the deduplication service (e.g., storing the hash value along with any other metadata useful in building the file/data object from the copy/instance in the IR). The method 200 may end at 290 or continue at 220 with receiving additional data objects.

When the deduplication service determines at 260 that the received data object is unique (i.e., no file at the location in the IR data structure), the method 200 continues at 264 with storing the unique data instance in the IR using the fingerprint to define the location (or file path) for the file (e.g., "CRC.instance"). At 266, the method 200 may also include updating the reduced-data repository or storage such as to include a pointer to the instance for the client device/application that provided the data object added to the IR. For example, the pointer may be the segmented/partitioned hash value or location data from the fingerprint (or may simply be the fingerprint) and metadata useful for building the file or other data object from the stored instance may also be written to the reduced-data store in step 266. The method 200 may again end at 290 or continue at 220 with receiving addition data with the deduplication service.

It may be useful at this point to provide one exemplary implementation, of the use of an IR with a directory structure corresponding to location information in fingerprints of data objects. As will, be appreciated from this description, embodiments of deduplication services configured as suggested utilize a unique method of storing instances of unique, deduplicated data objects. The method may be used on any standard file system/operating system (OS) combination. The method eliminates the need for indirect methods (e.g., database methods requiring two-step IR access) for locating unique objects. The method also increases the performance of locating metadata and data within a deduplicated dataset.

In embodiments of the method, identification of unique data objects may be accomplished by scanning the received data (data provided, for example, during ingest). During scanning, a SHA-512 (or other strong hash algorithm) hash signature is treated, and in parallel or sequentially, a standard CRC-32 value is created from the scanned data. When unique files or data blocks are identified in the method, they are stored in an IR. Rather than storing the instance data (e.g., a fingerprint including a parsed hash signature and a CRC code) in a database or index and incurring the overhead associated with a database/index, unique file instances are stored in regular files in the IR.

The directory structure of the IR may be based on the fingerprint values (or location portion formed from the hash value or hash signature) created by the data reduction operation. For example, the data object may be processed by a location component of the fingerprint generation module to produce a hash signature or value such. In one embodiment, for example, the hashing function used is a SHA-512 hash, and the result of hashing a data object is a 512-bit binary value that is translated into a 128-byte ASCII string. The fingerprinting generation module may then function to parse this string into sub-strings or segments. For example, one embodiment of the fingerprint generation module parses the hash signature string into 16 sub-strings that are each 32-bit chunks of the 512 total bits, with the number of sub-strings defining the number of sub-directories of the IR directory structure and each sub-string being used to create a subdirectory of the IR. In another embodiment, 8 sub-strings are provided that are each 64-bit chunks of the 512 total bits while another embodiment may call for 4 to 32 sub-directories may be used with the specific depth of the directory structure not being limiting to the invention. In the 16-substring example, for each unique instance of data, the file that represents that instance is stored in the IR in a directory that is 16 levels deep comprised of the ASCII sub-strings discussed above. The name of the file for the instance may be "<CRC value>.instance" for example.

Figure 3:
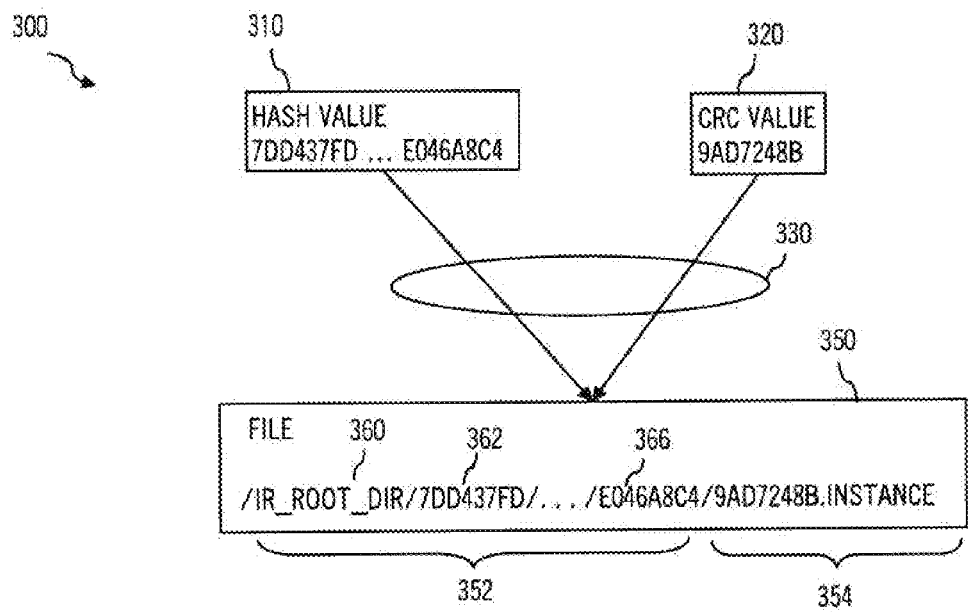
FIG. 3 is a block diagram showing the fingerprint generation process that may be implemented in embodiments described herein.

FIG. 3 illustrates an exemplary fingerprint generating process 300 for a received data object (not shown). For example, the fingerprint generating mechanism may use a location generation module (with a SHA-512 hashing algorithm or the like) to process the data object and provide a hash value or signature 310 (shown as 7DD437FD . . . E046A8C4 as an example). The fingerprint generating mechanism may use a CRC or other naming module to process the same data object to provide a unique identifier 320 (Shown as an exemplary output of a CRC-32 algorithm as 9AD7248B but another unique identifier-producing algorithm may be used, with the chosen name-generating process typically requiring significantly less processing the hashing algorithm but in most cases providing a unique value). At 330, the fingerprinting generation module may act to parse/divide the hash value into segments or sub-strings and combine this parsed location data with the unique name/identifier value 320 to provide instance data.

As shown, the resulting instance would be stored in the file 350 shown as "/IR_Root_Dir/7DD437FD/ . . . /E046A8C4/9AD7248B.instance" in this example as build from hash value 310 and CRC value 320. The instance data 350 includes a location component or portion 352 (which may also be thought of as the file path in the IR directory). The location component of the instance data 350 is configured in conventional file system form with a root directory identifier 360 (e.g., the IR root node) and each sub-directory 362, 366 as defined by the sub-strings obtained from the hash value 310 at 330. The instance data 350 also includes an identifier or naming component 354 that includes the CRC value 320 combined with ".instance" in this example.

Using this format for creating a fingerprint of a data object and then using this fingerprint to build an IR with conventional file system construct/directory structure and determining if ingested data is unique or duplicate provides a number of advantages. This formatting of fingerprints and locations of files in an IR has the advantage of not requiring a database or memory index be accessed to determine whether or not a given instance already exists in the system. Instead, the data reduction service may simply invoke a system call such as a POSIX stat( ) call or the like to determine, once a fingerprint is generated (with the location data used in the system call), whether the file already exists in the IR. If so, the newly received instance may be removed and a reference count to the particular instance may be incremented. Storing the instances in the IR in this manner (based on the fingerprint generated for each data object) also provides the advantage in use of being able to use normal system utilities such as commands ls, cp, chmod, and/or the like to view and/or manipulate the instance repository contents. Note, though, these system utilities (as well as some underlying libraries) may fail in some file system/operating system combinations when too many files reside in a single directory.

FIG. 4 illustrates a simplified directory structure 400 that may be provided using the methods described, herein to build an IR including fingerprinting ingested data objects during data reduction. The structure includes a root directory or node 410 identifying the files or instances being in the file system (s) associated with instance repository. The directory structure 400 may have a depth that is consistent for each file/instance 418, 428 as it is defined, at least in part, by the number of partitions or segments into which a location value (e.g., a hash value or signature) is divided up into during the fingerprint generation process. For example, the depth may be about 16 in the example provided above in which the 512-bit binary ASCII string is divided or parsed into 16 sub-strings of 32 bits each.

In the simplified example, the depth of directory structure 400 is much smaller as the location value (or hash value) is broken only into three equal sub-strings, and each of these sub-strings is used to define a sub-directory as shown specifically at 412, 414, 416 to define a location in the directory 400 for a file 418 (with a name of "CRC.instance", with the CRC being determined for the particular data object associated with file/instance 418). Other unique data objects would be processed to produce differing fingerprints with different hash values and CRCs, and these each would be used to build different sub-directories and provide a different location for a file 428 as shown with sub-directories 420, 422, 424 defined by sub-strings of the hash value associated with the file 428 (also being named based on its CRC as was the case of file 418).

The IR associated with structure 400 may be stored or provided in a single file system that is stored in a single or multiple data storage devices (e.g., a single or multiple disk drive devices). In other cases, though, the IR structure 400 may be carved up or divided up in any useful manner such as based on sub-directory values, and then each of these portions of the IR may be stored in different file systems on one or more machines and/or networks/systems, which may utilize the same or differing OS, data management software/applications, and the like.

Figure 5:
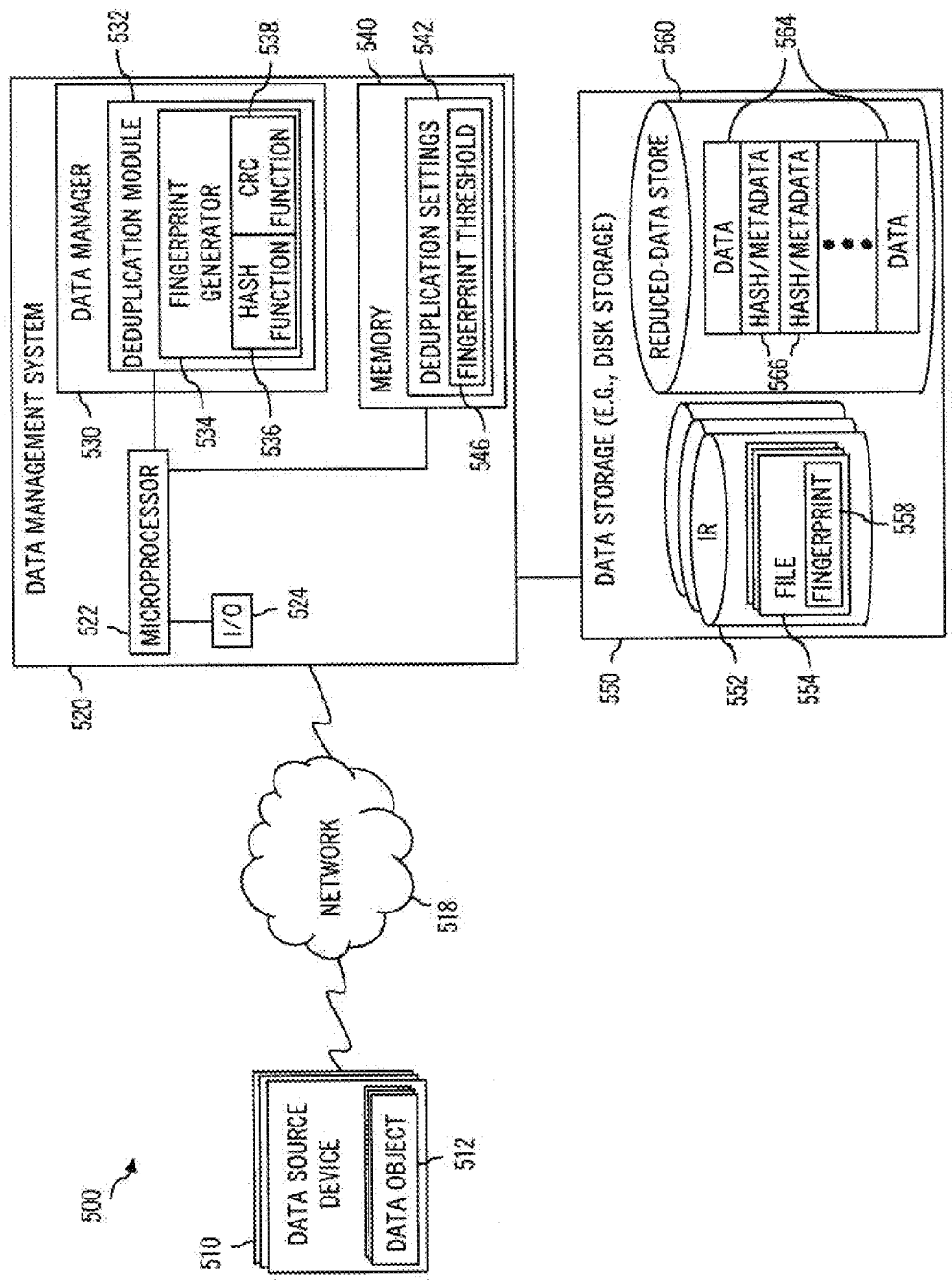
FIG. 5 illustrates a functional block diagram of a computer system that may be used to implement data reduction including fingerprint-based data deduplication (e.g., by implementing the method of FIG. 2 or the like).

FIG. 5 illustrates a computer system or network 500 in which the methods described herein (e.g., with reference to FIGS. 1-4) may be implemented to provide enhanced data reduction capabilities. The system 500 includes a plurality of data source devices 510 (such as client machines, servers, data storage devices, and the like) that each include one or more data objects that may be fed to a data management system 510 via a digital data communications network 518 (e.g., the Internet, an intranet, a local area network (LAN), a wide area network (WAN), or the like with wired and/or wireless connections). The data management system 520 may be provided with one or more computing or electronic devices such as a conventional server or the like and includes a microprocessor(s) 522 that controls and manages input/output devices 524, such keyboards, monitors, touchscreens, a mouse, and the like that may be used by an operator or system administrator to initiate a data reduction process and/or to set deduplication settings 542 stored in memory 540 such as fingerprint size thresholds 546 (e.g., defining how large a data object 512 has to be prior to applying the fingerprinting processes).

The microprocessor 522 also executes code to provide one or more software applications to provide the data management functions described herein such as data reduction that involved deduplication and then later retrieval of data from an IR 552 and/or reduced-data store 560. To this end, the data management system 520 is shown to include or be running a data manager 530 that includes a deduplication module 532. The module 532 may be used to perform the methods 100 and 200 of FIGS. 1 and 2 as well as to create fingerprints and data structures as shown in FIGS. 3 and 4. The module 532 may include a fingerprint generator 534 that acts to scan a received data object 512 and create a fingerprint (shown at 558 with file 558 in IR 552).

This may include using a hash function 536 (e.g., a SHA-512 function or the like) to produce a hash for the data object 512, using a CRC function/mechanism to generate a CRC code for the object 512, parsing the hash into sub-strings that define sub-directories of the IR 552 in a data storage 550 (e.g., disk storage device(s)) linked to the system 520, and combining the segmented hash or location component with the name component provided at least in part by the CRC code. The parsing step may be considered laying the key down as an index to a file system provided by/in the IR and/or as defining a file path to the file/instance in the IR.

During a data reduction process, the data manager 530 may process a received data object 512 using the deduplication module 532 to define a fingerprint 558 for the data object 512. The data manager 530 may then access the IR 552 with the location data provided by the fingerprint (e.g., the segmented hash value from the hash function 536 and generator 534) to determine whether one of the files 554 matches the data object (e.g., the received data object is a duplicate), which may involve querying the IR 552 with the location data to determine if there is a file 554 at the location defined by the fingerprint provided by generator 534. If the data object 512 is smaller than the threshold value 546) in the IR, the data manager 530 may, such as via operation of deduplication module 532, write the data 512 to the reduced-data store 560 as shown at 564 as part of this reduced-data dataset 562. If the data object 512 is not present in the IR 552, the data manager 530 may act to store a file 554 using the fingerprint (or instance data) 558 in the IR 552 (e.g., at the location defined by the segmented hash value). If the data object 512 is present in the IR 552, the data object 512 is a duplicate and the data manager 530 may act to store as shown at 566 only the hash value for the data object and metadata in the reduced-data store. The data object 512 may be removed from the system 500, and the entry 566 provides a pointer or reference for the data source 510 to later access/retrieve the file 554 associated with the data object.

Although the invention has been described and illustrated with a certain degree of particularity, it is understood that, the present disclosure has been made only by way of example, and that numerous changes in the combination and arrangement of parts can be resorted to by those skilled in the art without departing from the spirit and scope of the invention, as hereinafter claimed. Data deduplication is a standard feature in many data protection appliances and applications. Implementing deduplication using the methods (including the fingerprinting techniques and IR storage techniques) described herein storage products such as Sun Microsystems, Inc.'s Virtual Tape Library (VTL), Archive, Amber Road, and the like may be enhanced to provide a more efficient file management service including improved data reduction.

Product advantages when including modules performing the described methods may include creating a global namespace in which unique data may be stored. This namespace allows systems to easily consolidate instance repositories from multiple systems as well as replicate the repository to a central location. The method may result in a significant decrease in the processing required to identify duplicate data and store unique instances/data. Use of the method(s) may also increase the speed of locating and accessing unique instances during restore or other data access operations.

Embodiments of the subject matter described in this specification can be implemented as one or more computer program products, i.e., one or more modules of computer program instructions encoded on a computer-readable medium for execution by, or to control the operation of, data processing apparatus. For example, the modules used to provide the data reduction service 120 such as the fingerprint generation module and to provide data management system 520 with modules 532, and the like may be provided in such computer-readable medium and executed by a processor or the like. The computer-readable medium can be a machine-readable storage device, a machine-readable storage substrate, a memory device, a composition of matter affecting a machine-readable propagated signal, or a combination of one or more of them. The term "data management system" and computer systems used to provide a data reduction or deduplication service encompasses all apparatus, devices, and machines for processing data, including by way of example a programmable processor, a computer, or multiple processors or computers. The system (such as systems 100 and 500 of FIGS. 1 and 5) can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) used to provide the functionality described herein (such as to provide fingerprint generation including a hash function, a CRC mechanism, and the like) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Generally, the elements of a computer are a processor for performing instructions and one or more memory devices for storing instructions and data. The techniques described herein may be implemented by a computer system configured to provide the functionality described.

For example, FIG. 5 is a block diagram illustrating one embodiment of a computer system 500 configured to implement the methods described herein. In different embodiments, computer system 500 may be any of various types of devices, including, but not limited to a personal computer system, desktop computer, laptop, notebook, or netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or, in general, any type of computing or electronic device.

Typically, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, a digital camera, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry. To provide for interaction with a user (with an I/O portion 524 of system 520 or the like), embodiments of the subject matter described in this specification can be implemented on a computer having a display device, e.g., a CRT (cathode ray tube) or LCD (liquid crystal display) monitor, for displaying information to the user and a keyboard and a pointing device; e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

We claim:

1. A data deduplication method, comprising:
receiving by a data deduplication service provided on a computer system a data object from system data storage;
processing the data object with a fingerprint generation module executed by a microprocessor of the computer system to generate a fingerprint for the data object, wherein the fingerprint comprises a location component defining a file location in an instance repository, and the location component having a hash value output from a hashing algorithm run on the data object;
parsing the hash value into a plurality of sub-strings, wherein each of the sub-strings defines a location in the instance repository, the instance repository having a file system with a directory structure having a root directory and a plurality of sub-directories, and wherein the locations defined by the sub-strings correspond to a subset of the sub-directories; and
determining by the data deduplication service whether the data object is a duplicate by verifying presence of a file in the instance repository at the file location defined by the location component.

2. The method of claim 1, wherein the determining step comprises performing a system call on the instance repository providing the sub-strings as a file path to an instance in the instance repository.

3. The method of claim 1, further comprising when the file is not present at the file location updating the instance repository by storing the data object as a file at the file location defined by the location component.

4. The method of claim 1, further comprising when the file is present at the file location removing the data object from the system data storage and writing an entry to a reduced-data storage, the entry including at least the location component that is determined in part by a result of applying a hash function to the data object.

5. The method of claim 1, wherein the fingerprint for the data object further comprises a name component generated by performing a cyclic redundancy check (CRC) function on the data object.

6. A data reduction process, comprising:
ingesting by a microprocessor a plurality of data objects from a computer system;
generating a hash value for each of the data objects using a hash function;
parsing each of the hash values into a set of sub-strings;
determining whether a file is stored at the location defined by the set of sub-strings;
if the file is stored at the location, removing the data object corresponding to the set of substrings from the computer system; and
if the file is not stored at the location, storing the file associated with each of the data objects in an instance repository at a location defined by the set of sub-strings, wherein the instance repository has a directory structure comprising a plurality of sub-directories defined by values of the sub-strings with each set of sub-strings defining a file path in the directory structure.

7. The process of claim 6, wherein each of the sets of sub-strings has an equal number of the sub-strings and wherein the hash function comprises a SHA-512 hash.

8. The process of claim 6, further comprising with the microprocessor generating a fingerprint for each of the data objects by determining a CRC for each of the data objects and combining the CRC with the set of sub-strings for the corresponding one of the data objects.

9. The process of claim 8, further comprising determining a subset of the data objects are duplicates based on a system call using the sub-strings of the fingerprint to the instance repository as a file path and for the duplicates, writing entries in a reduced-data storage including at least the sub-strings of the fingerprint, whereby the sub-strings provide a pointer to an associated file in the instance repository.

10. The process of claim 6, wherein the hash function comprises a strong hashing algorithm and further comprising generating a fingerprint for each of data objects by combining the set of sub-strings with a CRC for the corresponding data object and further wherein the storing step is performed only when the data object is determined to be unique by a one step call to the instance repository based on the fingerprint.

11. A computer system comprising:
a processor;
a deduplication module run by the processor; and
an instance repository storing files in a file system according to a directory structure, each of the files corresponding with unique instances of data objects in a system,
wherein the deduplication module generates a fingerprint for each of the data objects including a location component and a name component, the location component comprising a plurality of sequential sub-strings as an output string of a hash function run on one of the data objects, the sub-strings defining sub-directories in a file path in the directory structure for storing associated one of the files in the instance repository,
wherein during data reduction, the deduplication module:
ingests additional ones of the data objects to determine the fingerprint for each of the additional objects,
queries the instance repository using the fingerprints,
stores a first subset of the additional objects that are determined to be non-duplicative based on the query, and
removes a second subset of the additional objects that are determined to be duplicative based on the query.

12. The computer system of claim 11, wherein each of the name components comprises an output of a cyclic redundancy check run on a corresponding one of the data objects.

13. The computer system of claim 11, wherein the query of the instance resource includes checking for one of the files at a location defined by the location component of the fingerprints of the subset of the additional data objects and wherein the file paths are defined by determining a hash value for the data objects and segmenting the hash value into sub-strings that are associated with sub-directories of the directory structure of the instance repository.

* * * * *